(12) United States Patent
Thio et al.

(10) Patent No.: US 6,649,901 B2
(45) Date of Patent: Nov. 18, 2003

(54) ENHANCED OPTICAL TRANSMISSION APPARATUS WITH IMPROVED APERTURE GEOMETRY

(75) Inventors: Tineke Thio, Princeton, NJ (US);
Richard A. Linke, Princeton, NJ (US);
Kelly M. Pellerin, Cranbury, NJ (US);
Thomas W. Ebbesen, Strasbourg (FR);
Henri J. Lezec, Strasbourg (FR)

(73) Assignee: NEC Laboratories America, Inc., Princeton, NJ (US)

( * ) Notice: Subject to any disclaimer, the term of this patent is extended or adjusted under 35 U.S.C. 154(b) by 35 days.

(21) Appl. No.: 10/098,970

(22) Filed: Mar. 14, 2002

(65) Prior Publication Data

US 2003/0173501 A1 Sep. 18, 2003

(51) Int. Cl.[7] .................................................. H01J 5/16
(52) U.S. Cl. ....................................................... 250/216
(58) Field of Search .............................. 250/216, 201.3, 250/306–311, 208.1, 227.11; 356/376; 359/244, 245, 738

(56) References Cited

U.S. PATENT DOCUMENTS

| | | |
|---|---|---|
| 3,866,037 A | 2/1975 | Simpson |
| 4,360,273 A | 11/1982 | Thaxter |
| 4,405,238 A | 9/1983 | Grobman et al. |
| 4,407,320 A | 10/1983 | Levine |
| 4,411,013 A | 10/1983 | Takasu et al. |
| 4,482,778 A | 11/1984 | Anderson |
| 4,554,727 A | 11/1985 | Deckman et al. |
| 4,556,790 A | 12/1985 | Glass et al. |
| 4,582,588 A | 4/1986 | Jensen et al. |
| 4,659,429 A | 4/1987 | Isaacson et al. |
| 4,662,747 A | 5/1987 | Isaacson et al. |
| 4,663,828 A | 5/1987 | Hanak |
| 4,663,829 A | 5/1987 | Hartman et al. |
| 4,815,854 A | 3/1989 | Tanaka et al. |
| 4,891,830 A | 1/1990 | Iwahashi |
| 5,028,546 A | 7/1991 | Hotchkiss |
| 5,096,791 A | 3/1992 | Yahalom |
| 5,250,812 A | 10/1993 | Murai et al. |
| 5,306,902 A | 4/1994 | Goodman |
| 5,351,127 A | 9/1994 | King et al. |
| 5,354,985 A | 10/1994 | Quate |
| 5,451,980 A | 9/1995 | Simon et al. |
| 5,498,576 A | 3/1996 | Hotchkiss et al. |
| 5,570,139 A | 10/1996 | Wang |

(List continued on next page.)

FOREIGN PATENT DOCUMENTS

JP 405240787 A 9/1993

OTHER PUBLICATIONS

Bethe, H. A., "Theory of Diffraction by Small Holes", *The Physical Review*, vol. 66, Nos. 7 and 8, pp. 163–182 (Oct. 1994).

(List continued on next page.)

*Primary Examiner*—Que T. Le
(74) *Attorney, Agent, or Firm*—Scully, Scott, Murphy & Presser

(57) ABSTRACT

An apparatus for enhanced light transmission is provided. The apparatus comprises a metal film having a first surface and a second surface, at least one aperture being provided in the metal film and extending from the first surface to the second surface. The at least one aperture comprises an entrance portion disposed on the first surface of the metal film and an exit portion disposed in the second surface of the metal film, each portion having a cross-sectional area in the plane of the corresponding metal film surface, wherein the cross-sectional area of the entrance portion is not equal to the cross-sectional area of the exit portion. A periodic surface topography is provided on at least one of the first and second surfaces of the metal film, the periodic surface topography comprising a plurality of surface features, wherein the geometry of each aperture entrance portion substantially matches the geometry of the surface features.

21 Claims, 10 Drawing Sheets

U.S. PATENT DOCUMENTS

| | | | |
|---|---|---|---|
| 5,633,972 | A | 5/1997 | Walt et al. |
| 5,646,051 | A | 7/1997 | Solin |
| 5,663,798 | A | 9/1997 | Karrai |
| 5,685,919 | A | 11/1997 | Saito et al. |
| 5,721,801 | A | 2/1998 | Boysel |
| 5,789,742 | A | 8/1998 | Wolff |
| 5,846,843 | A | 12/1998 | Simon |
| 5,933,233 | A | 8/1999 | Gunther |
| 5,973,316 | A | 10/1999 | Ebbesen et al. |
| 6,040,936 | A | 3/2000 | Kim et al. |
| 6,052,238 | A | 4/2000 | Ebbesen et al. |
| 6,127,624 | A | 10/2000 | Ishida et al. |
| 6,236,033 | B1 | 5/2001 | Ebbesen et al. |
| 6,261,943 | B1 | 7/2001 | Grupp |
| 6,285,020 | B1 | 9/2001 | Kim et al. |
| 6,555,813 | B1 * | 4/2003 | Beecher et al. ............. 250/281 |

OTHER PUBLICATIONS

Caldwell, M. E. et al., "Surface–Plasmon Spatial Light Modulators Based on Liquid Crystal", *Applied Optics*, vol. 31, No. 20, pp. 3880–3891 (Jul. 1992).

Chown, M., "Tight Fit", *New Scientist*, No. 2121 (Feb. 1998).

Cowan, J. J., "Aztec Surface–Relief Volume Diffractive Structure", *Journal of the Optical Society of America*, vol. 7, No. 8, pp. 1529–1544 (Aug. 1990).

Ebbesen, T.W. et al., "Extraordinary Optical Transmission Through Sub–Wavelength Hole Arrays", *Nature*, vol. 391, pp. 667–669 (Feb. 1998).

Evans, A. F. et al., "Measurement of the Electrically Induced Refractive Index Change in Silicon for Wavelength $\lambda$=1.3 $\mu$m using a Schottky diode", *Applied Physics Letters*, vol. 56, No. 3, pp. 212–214 (Jan. 1990).

Haginoya, C. et al., "Nanostructure Array Fabrication with a Size–Controllable Natural Lithography", *Applied Physics Letters*, vol. 71, No. 20, pp. 2934–2936 (Nov. 1997).

Lezec, H., "Light Squeeze", *Science NOW* (Feb. 11, 1998).

Ghaemi, H. F. et al., "Surface Plasmons Enhance Optical Transmission Through Subwavelength Holes", *Physical Review B*, vol. 58, No. 11, pp. 6779–6782 (Sep. 1998).

Raether, H., "Surface Plasmons on Smooth and Rough Surfaces and on Gratings", *Springer–Verlag*, pp. 1–136 (1998) (Month unknown).

Sambles, R., "More Than Transparent", *Nature*, vol. 391, pp. 641–642 (Feb. 1998).

Ordal, M. A. et al., "Optical Properties of the Metals Al, Co, Cu, Au, Fe, Pb, Ni, Pd, Pt, Ag, Ti and W in the Infrared and Far Infrared", *Applied Optics*, vol. 22, No. 7, pp. 1099–1119 (Apr. 1983).

Solgaard, O. et al., "High Frequency Attenuated Total Internal Reflection Light Modulator", *Applied Physics Letters*, vol. 61, No. 21, pp. 2500–2502 (Nov. 1992).

Van Belle, M., "Photons Squeeze Through Tiny Holes", *Photonics Spectra*, pp. 36–37 (May 1998).

Villeneuve, P. R., "Light Beats the Diffraction Limit," *Physics World* (Apr. 1998).

Wang, Y., "Voltage–Induced Color–Selective Absorption with Surface Plasmons", *Applied Physics Letters*, vol. 67, No. 19, pp. 2759–2761 (Nov. 1995).

Weber, W. H. et al., "Optical Electric–Field Enhancement at a Metal Surface Arising from Surface–Plasmon Excitation", *Optics Letters*, vol. 6, No. 3, pp. 122–124 (Mar. 1981).

Boardman, A.D. (ed.), *Electromagnetic Surface Modes*, Wiley–Interscience Publication, pp. 1–76, 661–724 (1982) (Month unknown).

Wood, R. W., "Amonalous Diffraction Gratings", *Physical Review*, vol. 48, pp. 928–936 (Dec. 1935).

Wood, R. W., "On a Remarkable Case of Uneven Distribution of Light in a Diffraction Grating Spectrum", *Philosophical Magazine*, vol. 4, pp. 396–403 (Jun. 1902).

Yeatman, E. M. et al., "Spatial light modulation using surface plasmon resonance", *Applied Physics Letters* vol. 55, No. 7, pp. 613–615 (Aug. 1989).

"Flooding light through tiny holes", *Science News*, vol. 153, No. 9 (Feb. 1998).

"Startling Amount of Light Gets Through Tiny Holes", John Wiley & Sons (1998) (Month unknown).

Botten, L.C. et al., "Inductive Grids in the Resonant Region: Theory and Experiment", *International Journal of Infrared and Millimeter Waves*, vol. 6, No. 7, pp. 511–575 (1985) (Month unknown).

Ulrich, R., "Far–Infrared Properties of Metallic Mesh and Its Complementary Structure", *Infrared Physics*, vol. 7, pp. 37–55 (1967) (Month unknown).

John, S., "Localization of Light", *Physics Today*, p. 32 (May 1991).

Yablonovitch, E. et al., "Hope for Photonic Bandgaps", *Nature*, vol. 351, p. 278 (May 1991).

Dalichaouch, R. et al., "Microwave Localization by Two–Dimensional Random Scattering", *Nature*, vol. 354, pp. 53–55 (Nov. 1991).

Joannopoulus, J.D. et al., *Photonic Crystals*, Princeton University Press, pp. 4–7 (1995) (Month unknown).

Haroche, S. et al., "Cavity Quantum Electrodynamics", *Physics Today*, pp. 24–30 (Jan. 1989).

Betzig, E. et al., "Near–Field Optics: Microscopy, Spectroscopy and Surface Modification Beyond the Diffraction Limit", *Science*, vol. 257, pp. 189–194 (Jul. 1992).

Born, M. et al., *Principles of Optics*, Pergamon Press, pp. 401–409 (1980) (Month unknown).

Ritchie, R.H. et al., "Surface–Plasmon Resonance Effect in Grating Diffraction", *Physical Review Letters*, vol. 21, No. 22, pp. 1530–1553 (Nov. 1968).

Chen, Y.J. et al., "Surface Plasmons on Gratings: Coupling in the Minigap Regions", *Solid State Communications*, vol. 46, No. 2, pp. 95–99 (1983) (Month unknown).

Kitson, S.C. et al., "Full Photonic Band Gap for Surface Modes in the Visible", *Physical Review Letters*, vol. 77, No. 13, pp. 2670–2673 (Sep. 1996).

Lochbihler, H. et al., "Surface Polaritions on Gold–Wire Gratings", *Physical Review B*, vol. 50, No. 7, pp. 4795–4801 (Mar. 1994).

Drexehage, K.H., "Interaction of Light with Monomolecular Dye Layers", *Progress in Optics*, vol. 12, pp. 165–232 (1974) (Month unknown).

U.S. patent application Ser. No. 60/185,239, Sakaguchi et al, filed Feb. 28, 2000.

U.S. patent application Ser. No. 60/638686, Thio, filed Aug. 15, 2000.

U.S. patent application Ser. No. 09/721,694, Sakaguchi et al., filed Nov. 27, 2000.

Roberts, A., "Near–Zone Fields Behind Circular Apertures in Thick, Perfectly Conducting Screens", *Journals of Applied Physics*, vol. 65, No. 8, pp. 2896–2899 (Apr. 1989).

Roberts, A., "Small–Hole Coupling of Radiation into a Near–Field Probe", *Journal of Applied Physics*, vol. 70, No. 8, pp. 4045–4049 (Oct. 1991).

Wessel, J., "Surface–Enhanced Optical Microscopy", *Journal of the Optical Society of America B*, vol. 2, No. 9, pp. 1538–1541 (Apr. 1985).

Fischer, U., "Submicrometer Aperture in a Thin Metal Film as a Probe of its Microenvironment Through Enhanced Light Scattering and Fluorescence", *Journal of the Optical Society of America B*, vol. 3, No. 10, pp. 1239–1244, (Oct. 1986).

Specht, M. et al., "Scanning Plasmon Near–Field Microscope", *Physical Review Letters*, vol. 68, No. 4, pp. 476–497 (Jan. 1992).

Ulrich, R., "Interference Filters for the Far Infrared", *Applied Optics*, vol. 7, No. 10, pp. 1987–1996 (Oct. 1968).

Sakai, K. et al., "Metallic Mesh Bandpass Filters and Fabry–Perot Interferometer for the Far Infrared", *Japanese Journal of Applied Physics*, vol. 8, No. 8, pp. 1046–1055 (Aug. 1969).

Renk, K.F. et al., "Interference Filters and Fabry–Perot Interferometers for the Far Infrared", *Applied Optics*, vol. 1, No. 5, pp. 643–648 (May 1962).

Garg, R.K. et al, "Far–Infrared Characteristics of Multi–Element Interference Filters Using Different Grids", *Infrared Physics*, vol.18, pp. 292–298 (Jan. 1978).

Chase, S.T. et al., "Resonant Array Bandpass Filters for the Far Infrared", *Applied Optics*, vol. 22, No. 1, pp. 1775–1779 (Jun. 1983).

Larsen, T., "A Survey of the Theory of Wire Grids", *IRE Transactions on Microwave Theory & Techniques*, pp. 191–201 (Feb. 1962).

Grupp, D.E. et al., "Beyond the Bethe Limit: Tunable Enhanced Light Transmission Through a Single Sub–Wavelength Aperture", *Advanced Materials*, vol. 11, No. 10, pp. 860–862 (1999) (Month unknown).

Valaskovic et al., "Parameter Control Characterization and Optimization in the Fabrication of Optical Fiber Near–Field Probes", *Applied Optics*, vol. 34, No. 7, pp. 1215–1227 (Mar. 1995).

Thio, T. et al., "Surface–Plasmon–Enhanced Transmission Through Hole Arrays in Cr Films", *Journal of Optical Society of America B*, vol. 16, No. 10, pp. 1743–1748 (Oct. 1999).

Porto, J.A. et al., "Transmission Resonances on Metallic Grating with Very Narrow Slits", *Physical Review Letters*, vol. 83, No. 14, pp. 2845–2848 (Apr. 1999).

Krishnan A. et al., "Enhanced Light Transmission by Resonance Tunneling Through Subwavelenth Holes", NEC Research Institute Technical Report No. 99–152 (1999) (Month unknown).

Oakley, W.S., "A Novel Digital Optical Tape Recorder", *Proceedings of the SPIE*, vol. 2604, pp. 256–262 (1996) (Month unknown).

Partovi A. et al., "High Power Laser Light Source for Near–Field Optics and Its Application to High Density Optical Data Storage", *Applied Physics Letters*, vol. 75, No. 11, pp. 1515–1517, (Sep. 1999).

Heisig, S., "Multifunctional Gallium Arsenide Sensors for Scanning Probe Microscopy", International Symposium on Ultra–High Optical Data Storage 2000, Tokai University, Numazu, Japan (Jun. 2000).

Heisig, S. et al., "Gallium Arsenide Probes for Scanning Near–Field Probe Microscopy", *Applied Physics A—Materials Science & Processing*, vol. 66, pp. S385–S390 (1998) (Month unknown).

Heisie, S. et al., "Optical Active Gallium Arsenide Cantilever Probes for Combined Scanning Near–Field Optical Microscopy and Scanning Force Microscopy", *J. Vac. Sci. Technol. B*, vol. 18, No. 3, pp. 1134–1137 (May 2000).

Heisig, S. et al., "Optical Active Gallium Arsenide Probes for Scanning Probe Microscopy", *SPIE Conference on Far–and Near–Field Optics: Physics and Information Processing*, pp. 305–312 (Jul. 1998).

Heisig, S. et al., "Monolithic Gallium Arsenide Cantilever for Scanning Near–Field Microscopy", *Ultramicroscopy*, vol. 71, pp. 99–105 (1998) (Month unknown).

Kim, Y.J. et al., "Fabrication of Micro–Pyramidal Probe Array with Aperture for Near–Field Optical Memory Applications", *Japanese Journal of Applied Physics*, vol. 39, Part 1, No. 3B, pp. 1538–1541 (Mar. 2000).

Goto, K., "Proposal of Ultrahigh Density Optical Disk System Using a Vertical Cavity Surface Emitting Laser Array", *Japanese Journal of Applied Physics*, vol. 37, Part 1, No. 4B, pp. 2274–2278 (Apr. 1998).

Iga, K., "Surface Emitting Lasers", *Electronics and Communications in Japan*, Part 2, vol. 82, No. 10, pp. 70–82 (1999) (Month unknown).

Kim, T.J. et al., "Control of Optical Transmission Through Metals Perforated With Subwavelength Hole Arrays", *Optics Letters*, vol. 24, No. 4, pp. 256–258 (Feb. 1999).

Hand, A.J., "Photons Squeeze Through Tiny Holes," *Photonic Spectra*, pp. 36–37 (May 1998).

Dalichaouch, R. et al., "Microwave Localization by Two–Dimensional Random Scattering," *Nature*, vol. 354, pp. 53–55 (1991) (Month unknown).

Schroter, U. et al., "Surface–Plasmon–Enhanced Transmission Through Metallic Gratings," *Physical Review B*, vol. 58, No. 23, pp. 15419–15421 (Dec. 15, 1998).

Grupp, D.E. et al., "Crucial Role of Metal Surface in Enhanced Transmission Through Subwavelength Apertures," NECI TR (Jun. 1, 2000).

Nagayama, K., "Fabrication of Two–Dimensional Colloidal Arrays," *Phase Transitions*, vol. 45, pp. 185–203 (1993) (Month unknown).

Grupp, D.E et al., "Crucial Role of Metal Surface in Enhanced Transmission Through Subwavelength Apertures," *Applied Physics Letters*, vol. 77, No. 11, pp. 1569–1571 (Sep. 11, 2000).

Ebbesen, T.W. et al., "Extraordinary Optical Transmission Through Sub–Wavelength Hole Arrays," *Nature*, vol. 391, pp. 667–669 (Feb. 12, 1998).

Tan, W.–C. et al., "Flat Surface–Plasmon Polariton Bands and Resonant Optical Absorpotion on Short–Pitch Metal Gratings," *Physical Review B*, vol. 59, No. 19, pp. 12661–12666 (May 15, 1999).

Wolff, P.A., "Coaxial NSOM," NECI TR (Aug. 14, 2000).

Thio, T. et al., "Enhanced Transmission Through a Sub-Wavelength Aperture Optimising the Surface Plasmon Geometry," NECI TR (May 19, 2001).

Ritchie, R.H., "Plasma Losses by Fast Electrons in Thin Films," *Physical Review*, vol. 106, No. 5 (Jun. 1, 1957).

Paviot, V.M. et al., "Measuring the Mechanical Properties of Thin Metal Films by Means of Bulge Testing Micromachined Windows," *Materials Research Society Symp. Proc.*, vol. 356 (1995) (Month unknown).

Raynolds, J. et al., "[G10.004] Micron–scale Frequency Selective Surfaces for Thermo–Photovoltaic Spectral Control," Session G10—Nonlinear Optics/Devices, (Mar. 13, 2001).

Okamoto K. et al., "Radiation Force Exerted on Subwavelength Particles near a Nanoaperture," *Physical Review Letters*, vol. 83, No. 22, (Nov. 29, 1999).

Thio et al., "Enhanced Light Transmission Through a Single Subwavelength Aperture," *Optics Letters*, vol. 26, no 24 (Dec. 15, 2001).

* cited by examiner

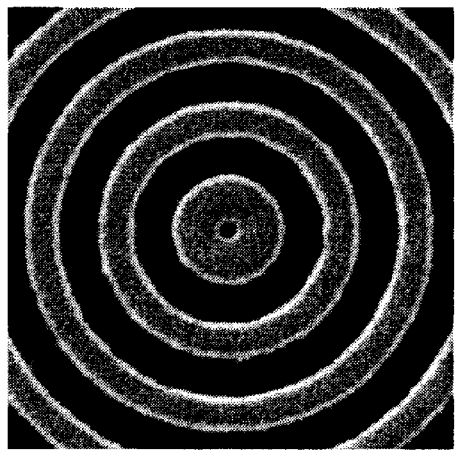
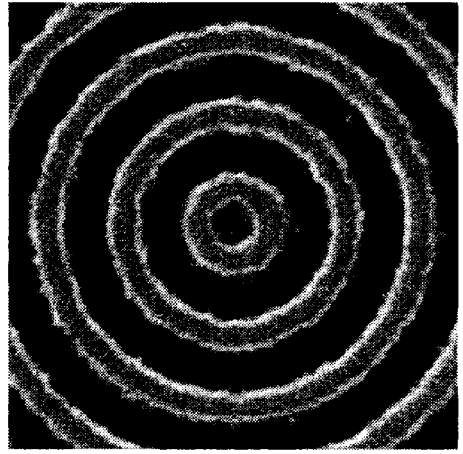
FIG. 6A     FIG. 6B
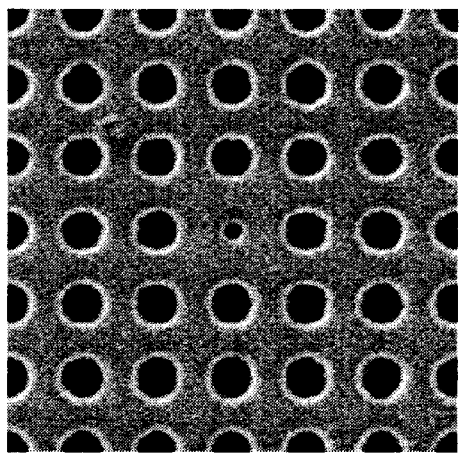
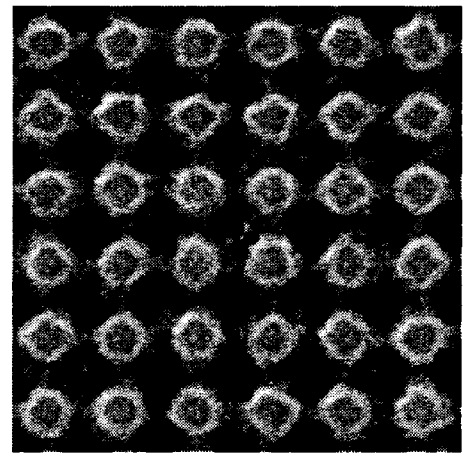
FIG. 6C     FIG. 6D
FIG. 6E     FIG. 6F ■ Square array of circular dimples, square-wave cross-sectional profile
□ Square array of circular dimples, sine-wave cross-sectional profile
● Concentric rings, square-wave cross-sectional profile
○ Concentric rings, sine-wave cross-sectional profile

ENHANCED OPTICAL TRANSMISSION APPARATUS WITH IMPROVED APERTURE GEOMETRY

FIELD OF THE INVENTION

The present invention relates to the field of optics, and in particular to the enhanced transmission of light through a metal film perforated with one or more apertures.

BACKGROUND OF THE INVENTION

As discussed in detail in U.S. Pat. No. 6,236,033 to Ebbesen et al., the optical transmission of a single, sub-wavelength aperture in a metal film can be strongly enhanced when the incident light is resonant with surface plasmons at the film's surface. In order to couple the incident radiation to the surface plasmons, the surface of the metal film must be provided with a periodic surface topography (i.e. surface features such as dimples or protrusions). The transmission enhancement has great potential in applications which require high optical throughput at high resolution, such as near-field microscopy and high-density optical data storage. This effect has the attractive feature that the wavelength of the resonance can be tuned by the periodicity of the surface features, the angle of incidence of the incident light and the refractive index of a dielectric provided substantially adjacent to the film. See, e.g., U.S. Pat. No. 5,973,316 to Ebbesen et al., U.S. Pat. No. 6,040,936 to Kim et al., U.S. Pat. No. 6,052,238 to Ebbesen et al., U.S. Pat. No. 6,236,033 to Ebbesen et al., and U.S. Pat. No. 6,285,020 to Kim et al. (each of these patents being incorporated herein by this reference and being referred to herein as the "Previous Patents").

The inventors have recently studied the effect of surface feature geometry on transmission enhancement, and found that the highest enhancement occurs for a set of concentric circular grooves (also referred to as depressed rings) surrounding a central, sub-wavelength aperture, in which the optimal groove depth is a few times the skin depth of the metal film. See T. Thio et al., "Enhanced Light Transmission Through a Single Subwavelength Aperture," *Optics Letters*, vol. 26, no. 24, pp. 1972–1974 (2001).

It has also been found that the an optimal periodic surface topography configuration is one in which the diameter of the surface features is one-half the periodicity of the surface features (that is, where $d_{SF}=P/2$), and in such a configuration, the optimal aperture diameter is $d_A=d_{SF}=P/2$. However, as the diameter of the aperture is made smaller, the transmission enhancement is reduced.

What is needed is an enhanced optical transmission apparatus which provides useful transmission enhancement even with very narrow apertures.

SUMMARY OF THE INVENTION

The present invention is an apparatus for enhanced light transmission wherein the transmission efficiency is even further enhanced in comparison to prior art devices by optimizing the geometry of the aperture as well as the relationship between the geometry of the aperture and the geometry of the surrounding periodic surface topography.

Generally speaking, an apparatus for enhanced light transmission is provided. The apparatus comprises a metal film having a first surface and a second surface, at least one aperture being provided in the metal film and extending from the first surface to the second surface. The at least one aperture comprises an entrance portion disposed on the first surface of the metal film and an exit portion disposed in the second surface of the metal film, each portion having a cross-sectional area in the plane of the corresponding metal film surface, wherein the cross-sectional area of the entrance portion is not equal to the cross-sectional area of the exit portion. A periodic surface topography is provided on at least one of the first and second surfaces of the metal film, the periodic surface topography comprising a plurality of surface features, wherein the geometry of each aperture entrance portion substantially matches the geometry of the surface features.

The present invention provides optical transmission enhancement even with apertures having an exit portion diameter which is significantly less than half the periodicity of the surface features.

BRIEF DESCRIPTION OF THE DRAWINGS

FIGS. 6A–6E are depictions of enhanced light transmission apparatus having a single aperture surrounded by a periodic surface topography, in which FIGS. 6A–6D are focused ion beam (FIB) images of examples of such apparatus having ring-symmetry (FIGS. 6A and 6B) and square-symmetry (FIGS. 6C and 6D), and having either a square-wave cross-sectional profile (FIGS. 6A and 6C) as represented schematically in FIG. 6E or a sinusoidal cross-sectional profile (FIGS. 6B and 6D) as represented schematically in FIG. 6F;

DETAILED DESCRIPTION OF THE PREFERRED EMBODIMENTS

Figure 1:
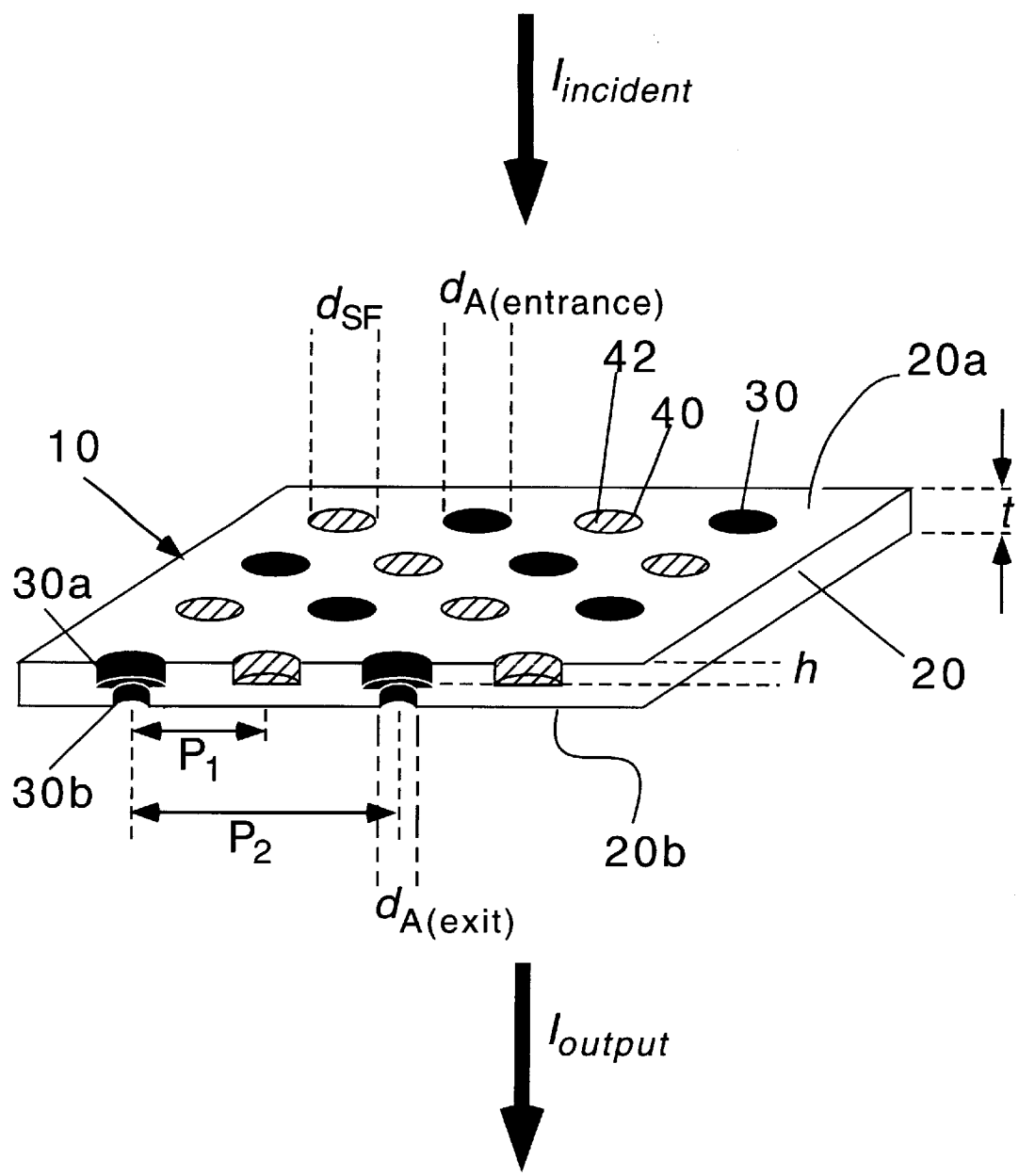
FIG. 1 is a perspective view of an exemplary embodiment of an enhanced light transmission apparatus of the present invention.

Referring now to the figures, FIGS. 1–4 illustrate (not necessarily to scale) several illustrative embodiments of an enhanced light transmission apparatus 10 of the present invention. Generally speaking, the enhanced light transmission apparatus 10 includes a metal plate or metal film 20 having a first surface 20a and a second surface 20b. The metal film 20 has at least one aperture or hole 30 provided therein. The at least one aperture 30 comprises an entrance portion 30a and an exit portion 30b. The aperture entrance portion 30a is disposed on the surface of metal film 20 upon which light will be incident such that light enters aperture 30 through entrance portion 30a and exits aperture 30 through exit portion 30b. At least one of the surfaces 20a, 20b of the metal film 20 includes a periodic surface topography as will be described below. Prior to describing particular embodiments of the invention, it will be useful to elaborate upon several terms which are important to understanding the invention.

Metal film 20 may comprise a metal film or a metal plate. The material comprising metal film 20 may be any conductive material, such as any metal, but need not be a metal. For example, metal film 20 may comprise a doped semiconductor at those optical frequencies for which $\epsilon_1 < 0$ and $|\epsilon_1| >> \epsilon_2$, where $\epsilon_1$ and $\epsilon_2$ are, respectively, the real and imaginary parts of the (wavelength dependent) dielectric constant of the doped semiconductor. Metal film 20 preferably comprises aluminum, silver or gold.

A surface which includes a periodic surface topography is any surface which exhibits raised and/or depressed regions (as opposed to a substantially smooth surface), wherein such regions are arranged with a periodicity or in a regularly repeated pattern (e.g. a regular, two-dimensional lattice). For example, surfaces which exhibit a periodic surface topography may include (but are not in any way limited to) the following: (1) a surface in which a plurality of cylindrical or semi-spherical concave depressions ("dimples") are provided, the dimples being arranged in a periodic pattern on the surface; (2) a surface in which a plurality of cylindrical or semi-spherical protrusions are provided, the semi-spherical protrusions being arranged in a periodic pattern on the surface; (3) a surface in which a plurality of curved or linear depressed grooves are provided, the grooves being arranged in a periodic pattern on the surface; (4) a surface in which a plurality of curved or linear raised ribs are provided, the ribs being arranged in a periodic pattern on the surface; (5) a surface in which a plurality of depressed or raised rings are provided, the rings being arranged in a periodic pattern (e.g. concentrically) on the surface; and (6) any combination of the above. In general, the periodic surface topography does not include the apertures 30 provided in the metal film 20, although a plurality of such apertures could be provided if desired.

To distinguish between apertures 30 (which pass through the entire thickness of the metal film) and protrusions/depressions in a metal film surface, which metal film is otherwise nominally smooth (aside from the apertures), the term "surface feature" will be used to refer to protrusions on the surface and depressions in the surface which do not pass through the entire thickness of the metal film and therefore are not apertures. For example, dimples, semi-spherical protrusions, grooves, rings and ribs are surface features.

It should be noted that the invention includes enhanced optical transmission apparatus having surface features of any desired shape, although certain shapes may be more advantageous than others as will be described below. In addition, the invention is not intended to be limited by any particular dimensions of the surface features (other than that the size and shape of the entrance to the aperture(s) substantially matches that of the surface features). Nevertheless, the width or diameter $d_{SF}$ of a surface feature (that is, the dimension of a surface feature in the direction of periodicity) should be made less than the period P of the surface features. It should also be noted that the invention is effective so long as a plurality of periodic surface features (i.e. at least two) are present. Indeed, the invention is effective with as few as two periodic surface features, although generally speaking a larger number of surface features will produce greater transmission enhancement.

The present invention is based on the geometry of the aperture(s) and the relationship between the geometry of the aperture(s) and the surface features comprising the periodic surface topography. In particular, the optical transmission enhancement apparatus of the present invention include aperture(s) each having an entrance portion with a geometry that substantially matches that of the surrounding surface features, and wherein the cross-sectional areas of the entrance portion and exit portion of each aperture are unequal.

Figure 2A:
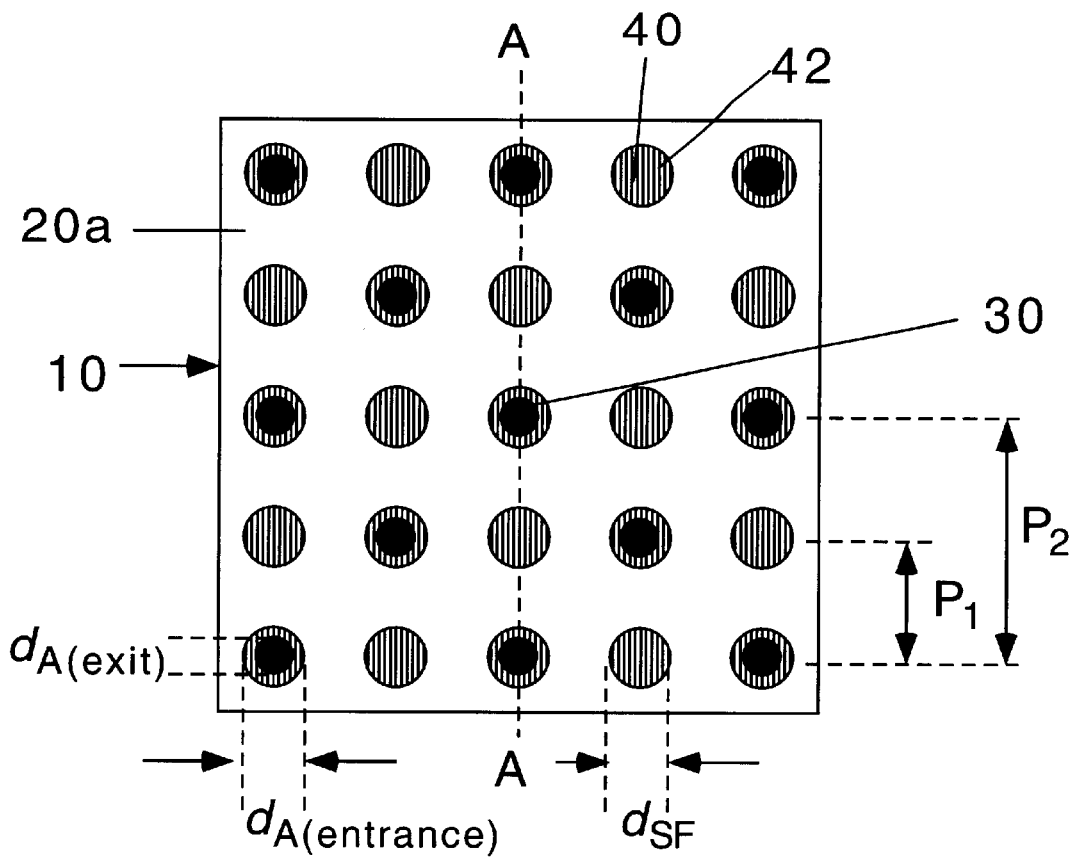
FIGS. 2A and 2B are plan views of first and second metal film surfaces, respectively, of the enhanced light transmission apparatus shown in FIG. 1.
Figure 2B:
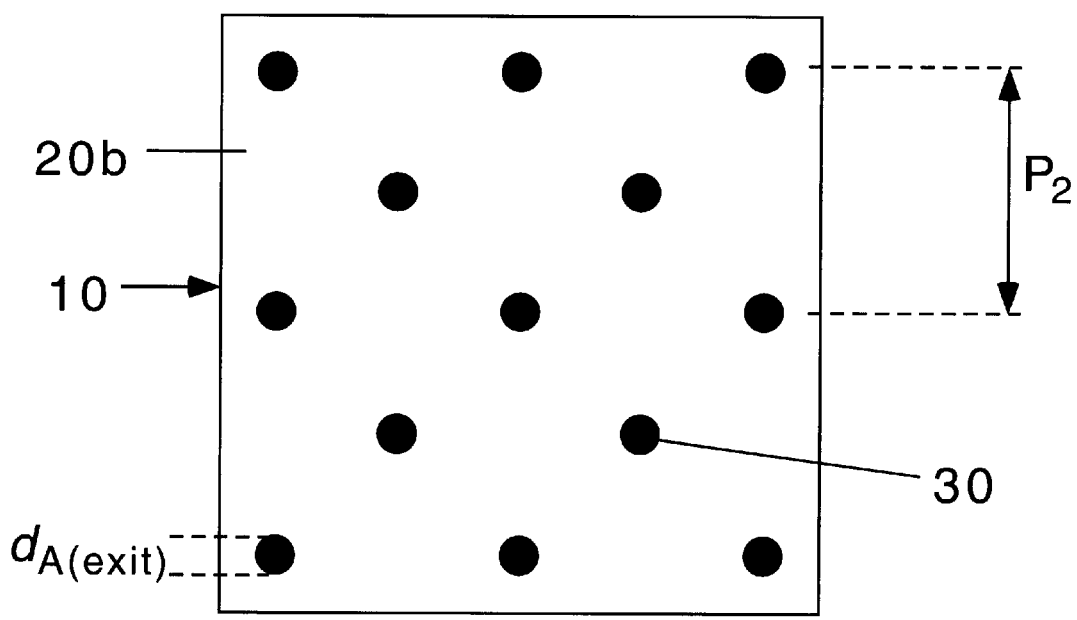

FIG. 1 is a perspective view of one exemplary embodiment of the enhanced light transmission apparatus of the present invention. The enhanced light transmission apparatus 10 shown in FIG. 1 includes a metal film 20 having a first surface 20a and a second surface 20b. A square array of circular apertures 30 are provided in the metal film 20 extending from first surface 20a to second surface 20b. Each aperture comprises an entrance portion 30a and an exit portion 30b. Plan views of the first surface 20a and second surface 20b are shown in FIGS. 2A and 2B, respectively. As shown in FIG. 2A, first surface 20a of metal film 20 is provided with a periodic surface topography comprising a plurality of surface features 40. In this example, the surface features are a square array of circular depressions or dimples 42, wherein the array has a period of $P_1$ as shown. First surface 20a also includes entrance portions 30a of the apertures 30 arranged in a square array complementary to that of the surface features 40 as shown. As shown in FIG. 2B, second surface 20b includes exit portions 30b of the apertures 30, the aperture array having a period of $P_2$. (It should be noted that where a periodicity is referred to herein as simply "P", this refers to the periodicity of the surface features ($P_1$ as shown in FIGS. 1 and 2).) As will be noted from a comparison of FIGS. 2A and 2B, the periodic surface topography of first surface 20a has a period $P_1$ which is half the period $P_2$ of the periodically arranged array of apertures on both surfaces 20a and 20b. The particular 2:1 ratio of periods $P_2:P_1$ shown in FIGS. 2A and 2B is merely illustrative and is not a value necessary for the invention.

The entrance portion 30a of each aperture has a geometry which substantially matches the geometry of the surface features comprising the periodic surface topography on metal film first surface 20a. In the present invention, the geometry of the entrance portion 30a of an aperture 30 matches the geometry of the surface features 40 when the cross' sectional profile of the aperture entrance portion 30a, as taken in a plane perpendicular to the metal film 20 through the aperture 30 and in a direction of the wave vector of the periodic surface topography, is substantially identical in size and shape to the surface features 40 in the same cross-section. In the particular example shown in FIGS. 1–2, the surface features are circular dimples 42, each having a diameter $d_{SF}$. Accordingly, the entrance portion 30a of each aperture 30 is also circular and has a diameter $d_{A(entrance)}$ which is substantially equal to $d_{SF}$. Thus, the cross-sectional profile of the aperture entrance portion is substantially identical to that of the dimples; in fact, for this case, the size and shape of the aperture entrance portion should be substantially identical to that of the dimples in all dimensions (see FIG. 1, for example, and FIG. 5A discussed below). As another example, in the case of concentric ring surface features, the cross-sectional profile of the aperture entrance portion should be substantially identical to that of the nearest ring (see FIGS. 4A and FIG. 5A discussed below). By substantially matching the geometry of each aperture entrance portion to that of the surface features, optical transmission is greatly enhanced as will be demonstrated below.

Furthermore, the cross-sectional area of the entrance portion 30a (as measured in the plane of metal film first surface 20a) of each aperture is not equal to that of the exit portion 30b (as measured in the plane of metal film second surface 20b). In the particular example shown in FIGS. 1–2, the diameter $d_{A(entrance)}$ of circular aperture entrance portion 30a is greater than the diameter $d_{A(exit)}$ of circular aperture exit portion 30b. Accordingly, in this example, the cross-sectional area in the plane of metal film 20 of the entrance portion 30a of each aperture 30 is greater than that of the exit portion 30b. Providing an optical transmission enhancement apparatus in which the cross-sectional areas of the aperture entrance and exit portions may be different is significantly advantageous and yields highly desirable design flexibility. In particular, the entrance portion of each aperture may be designed to maximize optical transmission through the apparatus while the exit portion of each aperture may be independently designed in accordance with the requirements of the ultimate application. For example, in applications where a very narrow beam of emitted light is desired (such as near-field scanning optical microscopes or optical read/write heads in which increased optical resolution is desirable), the aperture exit portion could be made narrower than the entrance portion so that a very narrow beam of light is emitted from the aperture while taking advantage of the greatly enhanced optical transmission provided by the wider aperture entrance portion.

For maximum transmission enhancement and maximum resolution, the diameter of both the entrance portion(s) 30a and the exit portion 30b of each aperture is preferably less than the wavelength of light incident on the aperture(s) (that is, the aperture entrance portion and exit portion preferably have subwavelength diameter). In addition, the thickness of the metal film 20, denoted as t in FIG. 1, must be such that the metal film is optically opaque). Preferably, t should be at least 5–10 times the skin depth of the metal film, although a thinner metal film may suffice so long as it is optically opaque in the wavelength of interest. For depressed surface features (that is, surface features comprising depressions in the surface of the metal film such as the dimples 42 shown in FIG. 1), the minimum thickness of the metal film at the sites of such depressed surface features (equivalent to the thickness of the metal film minus the amplitude of the surface features, or t–h)must be such that the metal film is still optically opaque at such sites. Accordingly, t–h is also preferably at least 5–10 times the skin depth of the metal film, although a thinner metal film may again suffice so long as it is optically opaque in the wavelength of interest.

The enhanced light transmission of the present invention operates as follows. Incident light, having an intensity of $I_{incident}$ and symbolically depicted by the arrow at the top of FIG. 1, is directed onto the first surface 20a of metal film 20 and into the entrance portion 30a of each aperture 30. The light is then transmitted from the exit portion 30b of each aperture 30 at second surface 20b of metal film 20 as output light having an enhanced intensity of $I_{output}$ and symbolically depicted by the arrow at the bottom of FIG. 1. It should be noted that enhanced transmission intensity also occurs if the light travels in the opposite direction through the structure (that is, if the light is incident on the second surface 20b and is transmitted as output light from first surface 20a having the periodic surface topography), but the enhancement in transmission intensity appears not to be as great in such a configuration. Accordingly, for maximum transmission enhancement, it is preferred that the light is incident on the surface having the periodic surface topography.

In the embodiment of FIGS. 1–2, an unsupported metal film 20 is shown (that is, the metal film 20 is not adjacent to or adhered to a supporting structure). However, a metal film 20 fixed to a substrate, such as by depositing the metal film on a glass or quartz, is also contemplated by the present invention. For example, a silver film of thickness t=0.3 μm may be deposited by evaporation on a fused quartz or glass substrate. When a single substrate is used, the periodic surface may be provided on either the exposed (air) surface or on the surface at the metal film-substrate interface. If the periodic surface topography is provided on the metal surface at the metal film-substrate interface, the surface features may be provided on the metal film by, for example, creating a "negative" of the pattern on the substrate surface and depositing the metal film onto the negatively patterned substrate surface. Alternatively, the metal film 20 may be sandwiched between two such substrates. See, e.g., U.S. Pat. No. 6,285,020 to Kim et al.

Furthermore, while the apertures 30 and surface features 40 in the embodiment of FIGS. 1–2 are shown as circular, these features may have other shapes, such as oval, rectangular, triangular or slit-shaped, without departing from the scope of the invention. Indeed, surface features 40 may include protrusions and/or depressions in the corresponding surface of any size (so long as the width or diameter $d_{SF}$ of the surface feature is less than the period of the surface features) or shape as discussed above. Additionally, while the periodic arrays shown in the embodiment of FIGS. 1–2 are square arrays, other two-dimensional periodic array configurations of apertures and surface features are also possible, such as triangular, without deviating from the teaching of the invention. Moreover, it is preferable that the site of each aperture be located in a "valley" of the periodic surface topography; that is, at a location where, in the absence of an aperture at that location, the thickness of the metal film would be at a minimum due to the cross-sectional variations of the periodic surface topography.

Figure 3A:
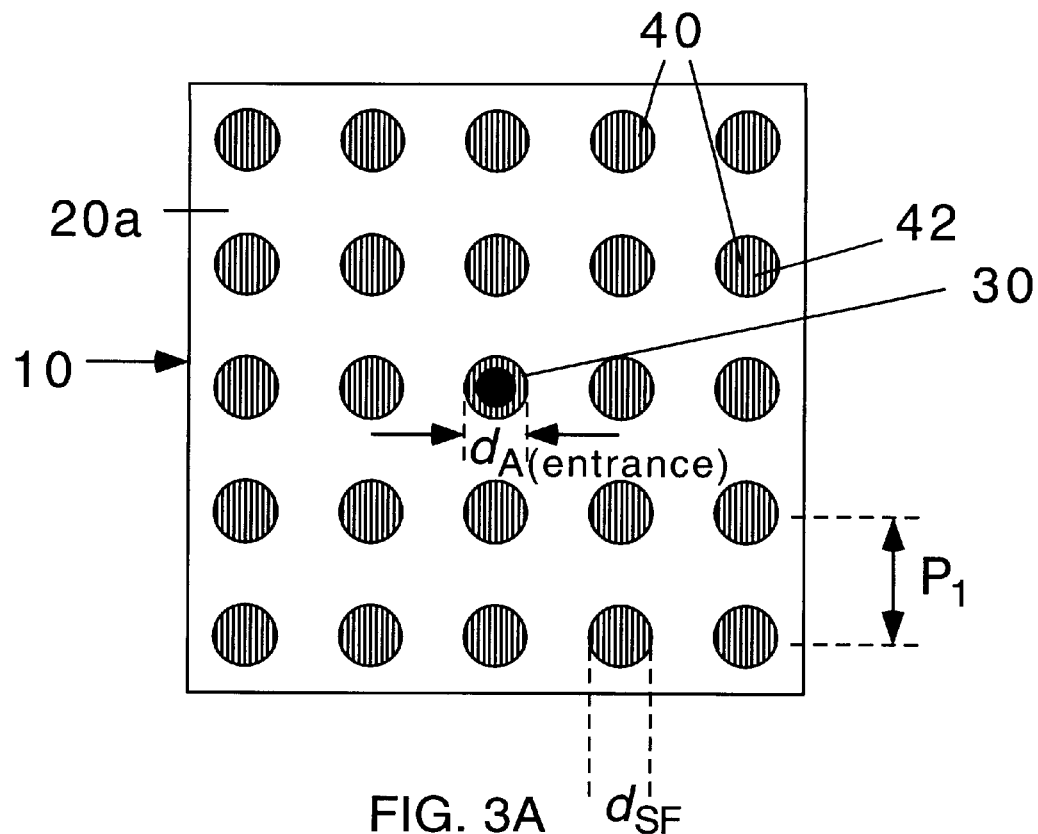
FIGS. 3A and 3B are plan views of first and second metal film surfaces, respectively, of another exemplary embodiment of an enhanced light transmission apparatus of the present invention.
Figure 3B:
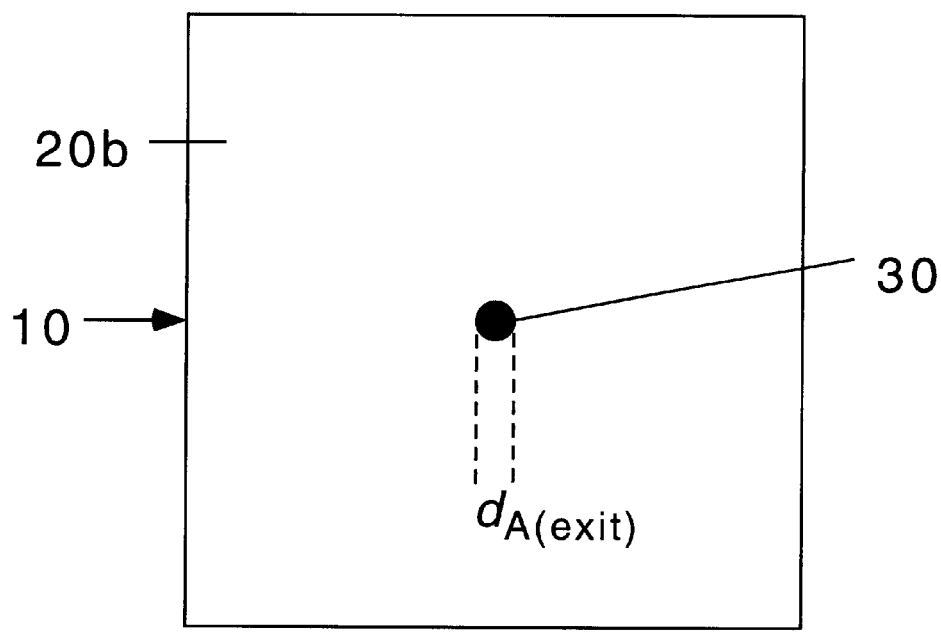

FIGS. 3A and 3B are plan views of first and second surfaces 20a and 20b, respectively, of another exemplary embodiment of the enhanced light transmission apparatus of the present invention. In this embodiment, the metal film 20 has a single aperture 30 provided therein. First surface 20a is provided with the single aperture 30 and surface features 40 comprising a plurality of circular dimples 42 similar to those shown in the embodiment of FIGS. 1–2, the dimples 42 having a diameter $d_{SF}$ as shown and being arranged in a periodic pattern with a period $P_1$. Second surface 20b is provided only with the single aperture 30. When light is directed incident on first surface 20a, output light having an enhanced intensity is transmitted from the aperture 30 at second surface 20b.

Figure 4A:
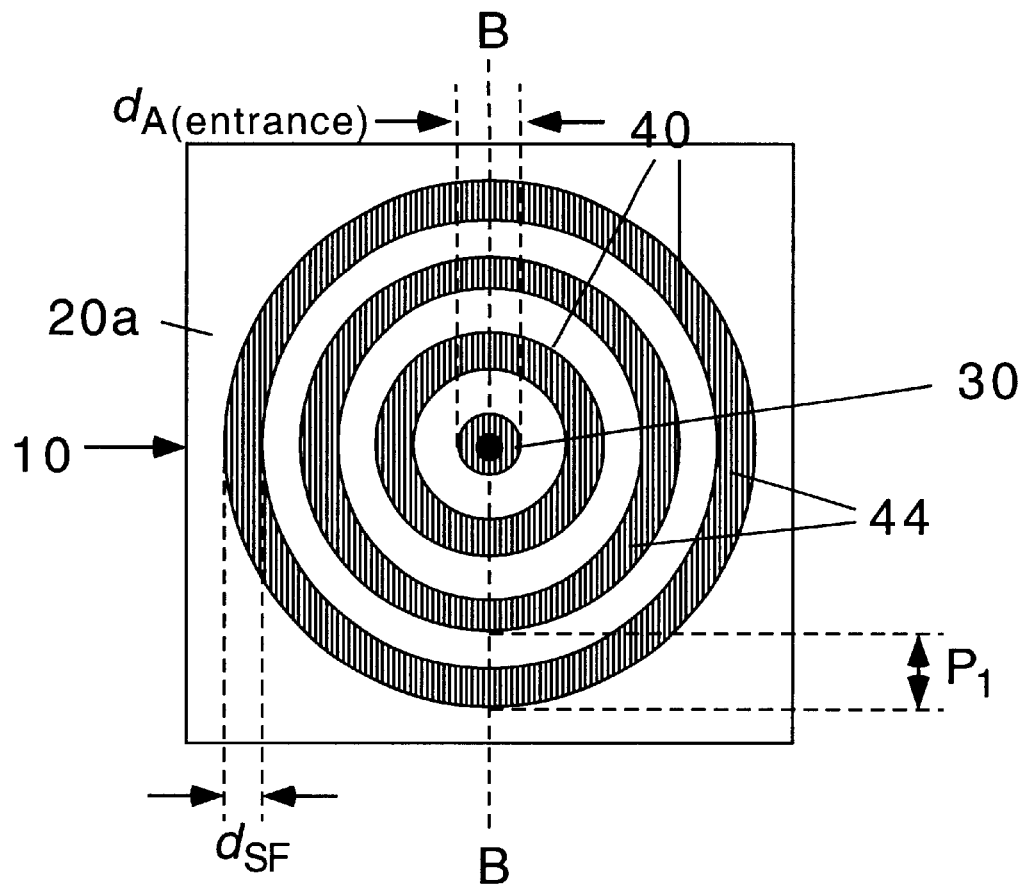
FIGS. 4A and 4B are plan views of first and second metal film surfaces, respectively, of yet another exemplary embodiment of an enhanced light transmission apparatus of the present invention.
Figure 4B:
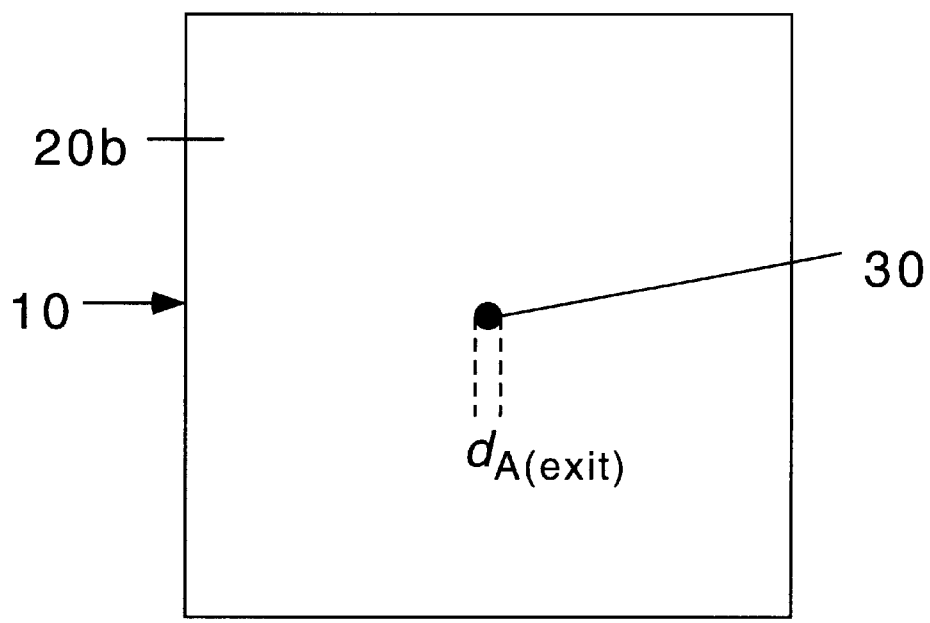

FIGS. 4A and 4B are plan views of first and second surfaces 20a and 20b, respectively, of yet another exemplary embodiment of the enhanced light transmission apparatus of the present invention. Once again in this embodiment, the metal film 20 has a single aperture 30 provided therein. First surface 20a is provided with the single aperture 30 and surface features 40 comprising depressed (that is, depressions provided in the metal film surface) concentric rings 44. The periodicity in this embodiment is in the radial direction as opposed to the (x, y) periodicity shown in FIGS. 1–3. The rings 44 have a width in the direction of periodicity of $d_{SF}$ as shown and are arranged in a periodic pattern (i.e. concentrically with periodically increasing radii) with a period $P_1$. Second surface 20b is provided only with the single aperture 30. When light is directed incident on first surface 20a, output light having an enhanced intensity is transmitted from the aperture 30 at second surface 20b. In this embodiment, it is most preferable to provide concentric circular rings 44 with a depth of 100 nm, although the invention is not intended to be limited in any way by this value.

In the embodiments of FIGS. 1–4, depressed surface features (e.g. dimples depressed rings) are shown. The invention also encompasses raised surface features as noted above. For example, raised surface features provided in the periodical arrangements shown in FIGS. 1–4 (e.g. raised circular protrusions, or raised concentric rings) could alternatively be provided.

While the geometry of the entrance portion of each aperture substantially matches the geometry of the surface features comprising the periodic surface topography, the geometry of the exit portion of each aperture is not similarly constrained. In fact, the exit portion of each aperture may be constructed in a variety of configurations as desired. FIGS. 5A–5D illustrate some examples of such aperture exit portion configurations, although it should be noted that the invention is not intended to be limited by these examples. In each of these examples, it will be noted that the cross-sectional area of the entrance portion 30a of the aperture in the plane of the metal film first surface 20a is greater than the cross-sectional area of the exit portion 30b of the aperture in the plane of the metal film second surface 20b.

Figure 5A:
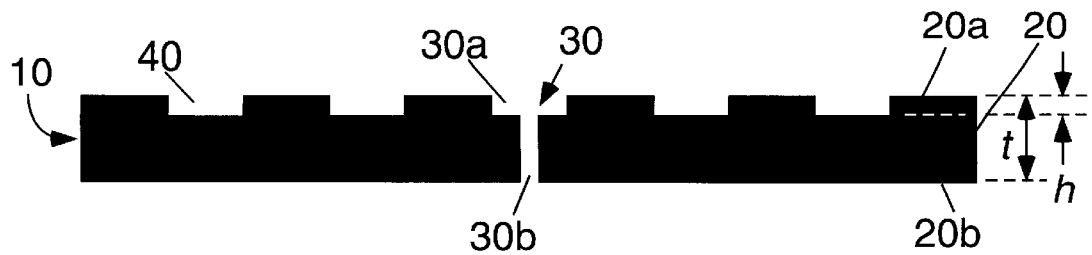
FIGS. 5A–5D are schematic cross-sectional views of various embodiments of enhanced light transmission apparatus of the present invention.
Figure 5B:
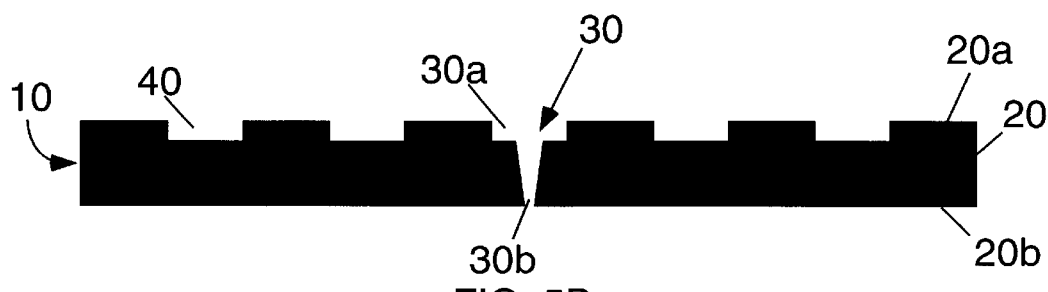
Figure 5C:
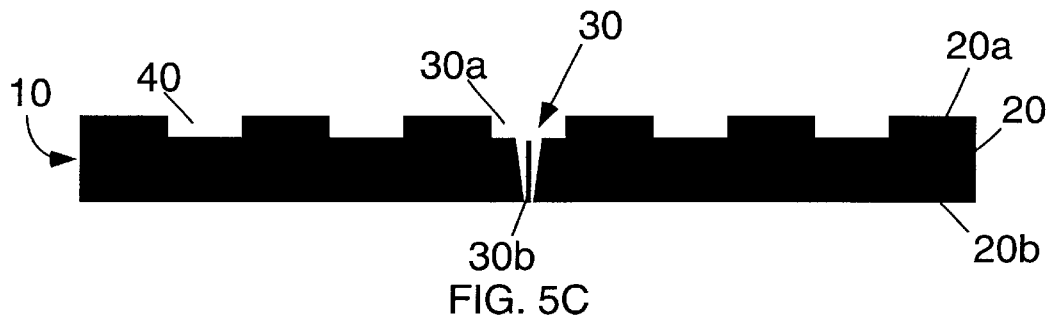
Figure 5D:
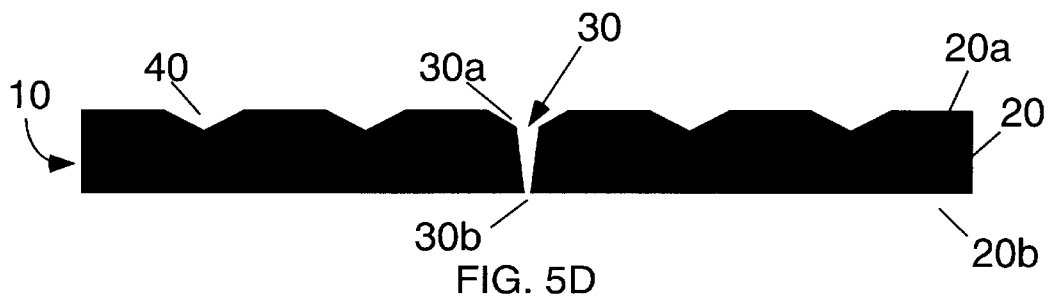

FIGS. 5A–5D schematically illustrate an enhanced light transmission apparatus 10 in cross-section in a plane perpendicular to that of the metal film 20 cylindrical and passing through both an aperture 30 and depressed surface features 40 in a direction of periodicity of the surface features (for example, a plane perpendicular to the metal film and through the line A—A in FIG. 2A or the line B—B in FIG. 4A). In FIGS. 5A–5C, the surface features 40 have a square-wave cross-sectional profile. FIG. 5A shows an exemplary enhanced light transmission apparatus in which the exit portion 30b of aperture 30 is cylindrical, similar to that shown in FIG. 1. FIG. 5B shows another exemplary enhanced light transmission apparatus in which the exit portion 30b of aperture 30 is shaped like a cone or a frustum. FIG. 5C shows yet another exemplary enhanced light transmission apparatus in which the exit portion 30b of aperture 30 is provided with a coaxial structure with a thin metallic wire at its axis. FIG. 5D shows still another exemplary enhanced light transmission apparatus in which the exit portion 30b of aperture 30 is shaped like a cone or a frustum as in FIG. 5B, but wherein the surface features 40 and entrance portion 30a of aperture 30 have a cone-shaped cross-sectional profile as well. The aperture exit portions depicted in FIGS. 5A, 5B and 5D may be constructed using standard focused ion beam (FIB) techniques as known in the art. The coaxial aperture exit portion depicted in FIG. 5C may be constructed by milling the desired profile into the surface of the substrate, including the central metallic feature, then metalizing, and subsequently milling away the metal which connects the core and the outer sheath of the coaxial structure, and typically requires that the metal film be supported by a substrate so as to secure the axial wire within the aperture.

In addition to the optical transmission enhancement features noted above, further optical transmission enhancement can be obtained, if desired, by filling the aperture with a dielectric material having an index of refraction greater than that of air, such that the effective wavelength of light in the dielectric material is less than that in air. Suitable dielectric materials for this purpose including but not limited to $SiO_2$, $SiN_x$ and $TiO$, for example. This technique operates even where $d_{A(exit)}$ is small (i.e. less than about P/2). This arrangement is also useful for keeping undesirable foreign particles or contaminants, such as dust, out of the aperture. This feature may be important, for example, in applications in which the enhanced light transmission apparatus travels over potentially unclean surfaces such as storage media.

To evaluate the relationship between aperture and surface feature geometries and their effects on optical transmission enhancement, several structures having various configurations were studied. The structures of this study were fabricated in a free-standing Ni film (see U.S. Pat. No. 6,261,943 to Grupp) having a thickness of 300 nm and coated on one side with a 100 nm thick layer of Ag. For each structure, a single cylindrical aperture was milled in the film using a Micrion 9500 focused ion beam (FIB) with a beam resolution of 5 nm. The topography of the surrounding Ni surface was milled also using the FIB. Subsequently, a 30 nm thick layer of Ag was sputtered over the Ni surface since Ag provides a much larger surface plasmon enhancement than Ni. A periodic surface topography was then provided consisting of either a set of depressed concentric rings with mean radii given by $R_k$=kP (P=750 nm, k=1,2, . . . ,10) (FIGS. 6A, 6B) or a square array of indentations with lattice constant P=750 nm (FIGS. 6C, 6D), wherein P is the periodicity of the periodic surface topography (for example, $P_1$ as shown in FIG. 1). The cross-section profile (that is, the cross-section taken in a plane perpendicular to that of the metal film) of the periodic surface topography was either square-wave (FIGS. 6A, 6C, 6E) or sinusoidal (FIG. 6B, 6D, 6F) (the "square-wave" version of the periodic surface topography comprise a square array of cylindrical dimples in the metal surface). The transmission through the device was measured under illumination with a tungsten halogen lamp, in a Nikon microscope coupled to an ISA imaging monochromator and a Princeton Instruments CCD camera. The apertures were spaced at least 50 μm from each other in order to minimize scattered light from neighboring devices. An iris was placed in front of the sample in order to restrict the angular spread of the illumination to less than 3°.

Figure 7:
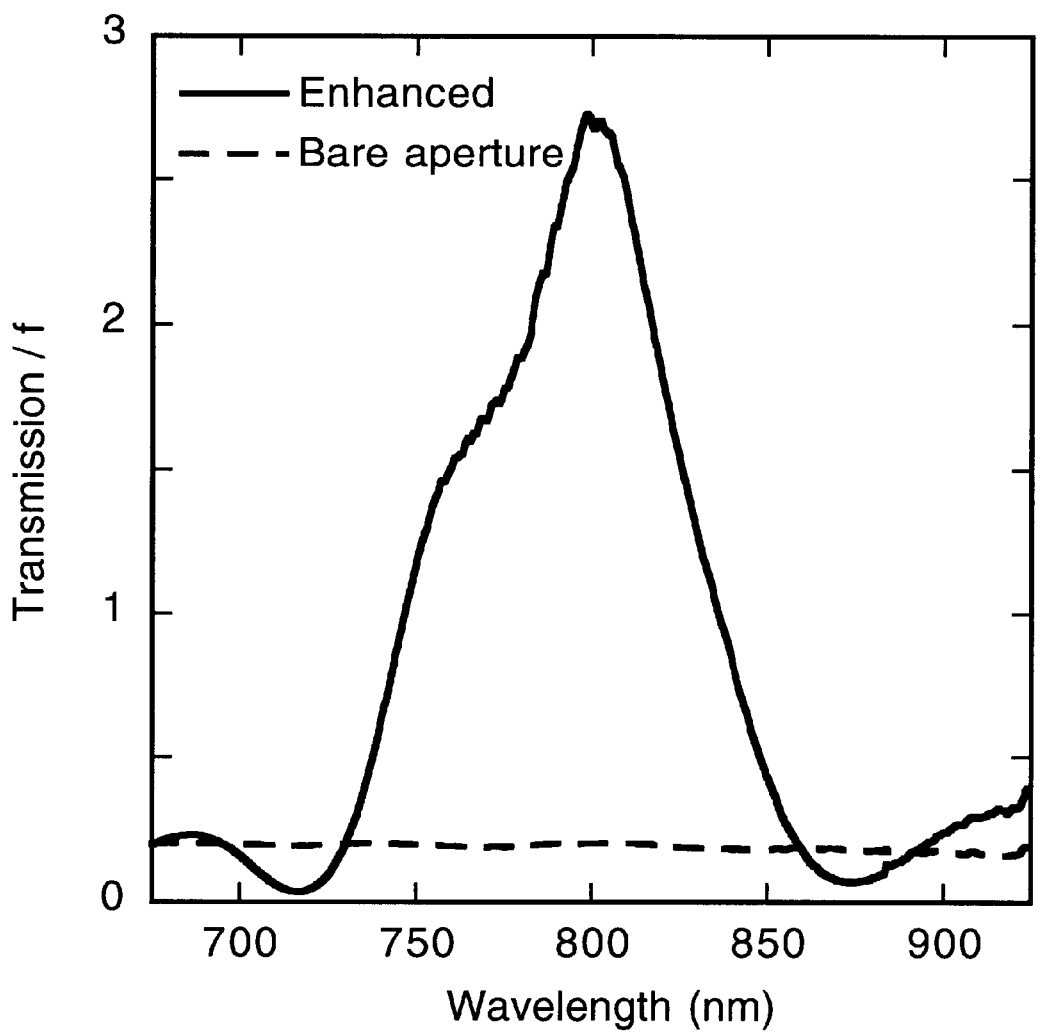
FIG. 7 is a graph showing the transmission spectrum of a single aperture enhanced light transmission apparatus with a concentric ring periodic surface topography having a sinusoidal cross-sectional profile (solid line) compared to that of a similar aperture without a periodic surface topography (dashed line)

FIG. 7 shows the transmission spectrum of a single cylindrical aperture having a diameter $d_{A(exit)}$=400 nm surrounded by depressed concentric rings with sinusoidal cross-sectional profile with amplitude (that is, the depth or height of the surface features as indicated in FIG. 1, for example) of h=120 nm; the light is incident on the side of the metal film having the periodic surface topography. The transmission is strongly enhanced compared to that of a "bare" sub-wavelength aperture in an otherwise smooth metal film (dashed line in FIG. 7) at two wavelengths close to the periodicity P: λ=760 nm and λ=800 nm. These two distinct resonances reveal the presence of a gap in the surface plasmon dispersion relation. The resonances correspond to the two standing-wave surface plasmon modes on either side of the gap, distinguished by their displaced charge distributions and thus their electromagnetic field intensities. See T. Thio et al, supra. In the shorter-wavelength surface plasmon mode (λ=760 nm) the surface charge oscillates at the ridges (and in the valleys) of the surface topography, whereas the longer-wavelength mode (λ=800 nm) involves charges moving between the ridges and the valleys. For the latter mode the electric field intensity is maximal at the centers of the concentric rings, and thus also at the center of the aperture entrance, leading to higher transmission than is the case for the other mode, as is apparent in FIG. 7. The following discussion focuses on the resonance at λ=800 nm.

The surface-plasmon enhancement factor $F_{sp}$ is defined to be the ratio of the single-aperture transmission with and without surface plasmon enhancement. The enhancement factor is plotted in FIG. 8 for λ=800 nm as a function of aperture exit portion diameter $d_{A(exit)}$, for the four surface topography geometries illustrated in FIG. 6, all with depth h=150 nm. For a concentric ring surface topography with a sinusoidal cross-section profile (open circles in FIG. 8), the aperture diameter dependence follows $F_{SP} \sim d_{A(exit)}^{-2}$ (indicated in FIG. 8 by a solid line for concentric ring surface features and by a broken line for a square array of dimple-shaped surface features). It will be noted that the data point for $d_{A(exit)}$=400 nm, which falls below the $F_{SP} \sim d_{A(exit)}^{-2}$ line, also consistently falls below the transmission of other samples as various parameters, such as the depth of the surface features, are varied. The solid circles in FIG. 8 indicate the results for a concentric ring surface topography with a square-wave cross-section profile. Within experimental error, the transmission enhancement is equal to that of concentric rings with a sinusoidal cross-section profile, except for the smallest aperture ($d_{A(exit)}$=200 nm) for which the transmission enhancement falls below the $F_{SP} \sim d_{A(exit)}^{-2}$ line.

Figure 8:
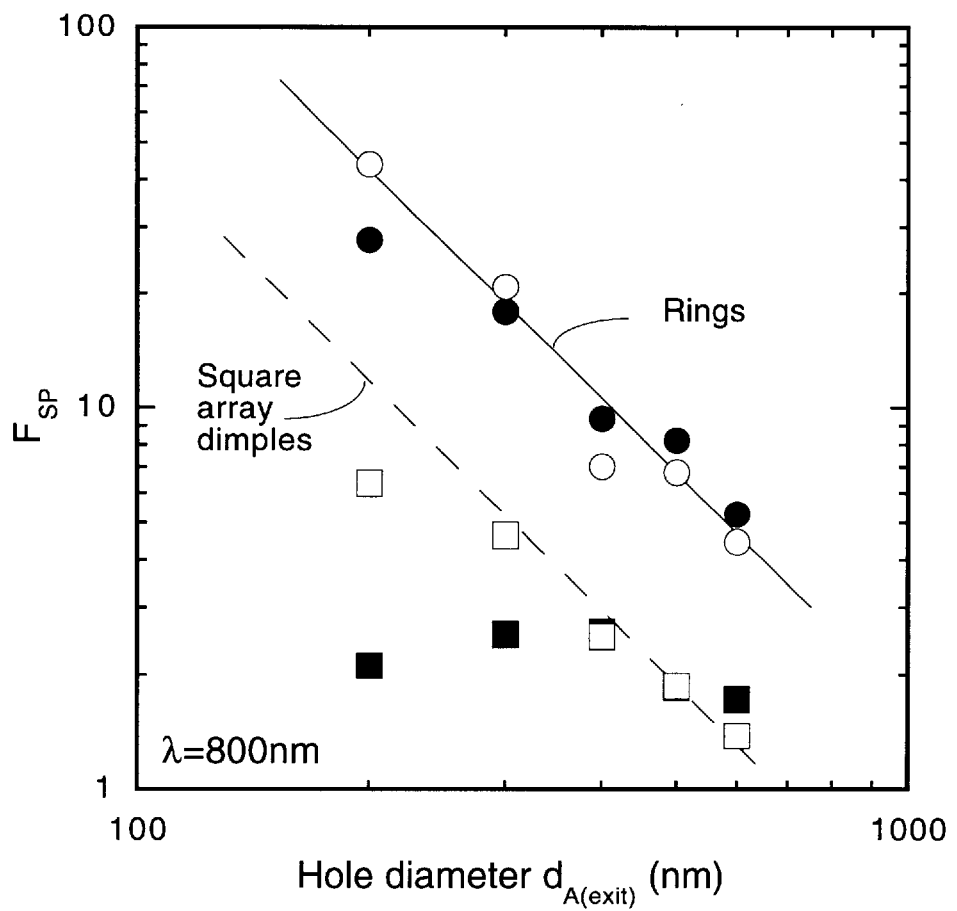
FIG. 8 is a graph showing the transmission enhancement factor $F_{SP}$ as a function of aperture diameter for the enhanced light transmission apparatus shown in FIG. 6 having a periodic surface topography comprising either concentric rings (circles) or a square array of dimples (square symbols) and having either square-wave (closed symbols) or sinusoidal (open symbols) cross-sectional profiles.

When the surface topography has square translational symmetry (FIGS. 6C, 6D; square symbols in FIG. 8), $F_{SP}$ is significantly lower than for the concentric ring structures (FIGS. 6A, 6B; circles in FIG. 8). The difference can be explained by considering that the symmetry of the Huygens wave associated with the central aperture has cylindrical symmetry in the case of unpolarized light, such as used in these experiments. See T. Thio et al., supra. The cylindrical symmetry of such a Huygens wave provides a much better match to the eigenmodes of the surface plasmons on the concentric ring surface topography than those on the square-symmetry surface topography, where the surface plasmon modes are plane waves at the metal surface.

For both concentric ring and square-lattice surface topographies, the transmission enhancement for large aperture diameters (that is, those approaching the wavelength of incident light) does not depend on whether the cross-sectional profile of the surface topography is squarewave or sinusoidal. This is an attractive feature in the fabrication of practical devices, since the enhancement is robust to such fabrication issues as rounding of the surface features. However, for $d_{A(exit)} \leq 300$ nm, $F_{SP}$ is consistently larger for the sinusoidal than for the square-wave case, and the discrepancy becomes larger with decreasing aperture diameter. For the square array of dimples (solid square symbols in FIG. 8) the relative transmission enhancement for $d_{A(exit)}$=100 nm lies nearly one order of magnitude below the $d_{A(exit)}^{-2}$ line extrapolated from large $d_{A(exit)}$.

The deviation between the sine wave and square wave configurations at small $d_{A(exit)}$ from the $F_{SP} \sim d_{A(exit)}^{-2}$ dependence in FIG. 8 may be explained by comparing the geometry of the aperture to that of the surrounding surface topographies. For sinusoidal cross-sectional profiles, both with axial and square symmetry, the aperture is provided at the bottom of a valley which forms a natural part of the surrounding periodic surface topography (FIG. 6F). In contrast, for the surface topographies with square wave cross-sectional profile, the aperture is cylindrical throughout the thickness of the metal film (FIG. 6E), and at the film surface can be drastically different from the rest of the surface topography. This is particularly clear in the case of small apertures with a square array of dimples (FIG. 6C). Since the surface plasmons are Bloch waves which exist in the matrix of the periodic surface topography, such a departure from the periodic structure forms a defect which forms either a scattering center or an absorption site for the surface plasmons. In either case, the enhancement of the electric field at the aperture entrance is reduced, thus leading to smaller transmission enhancement.

Figure 9A:
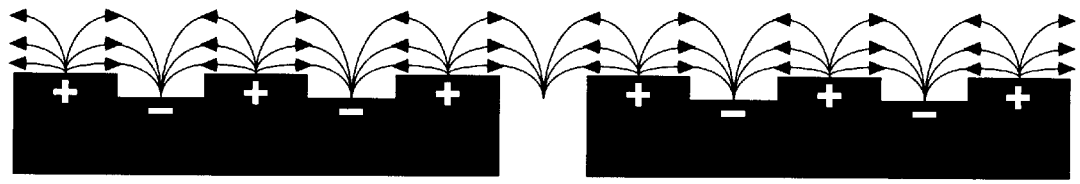
FIGS. 9A–9F are schematic cross-sectional views of various enhanced light transmission apparatus and illustrating surface charge displacement (indicated by + and − symbols) and electric field lines associated with surface plasmon resonance for various aperture entrance and exit geometries and periodic surface topography configurations.
Figure 9B:
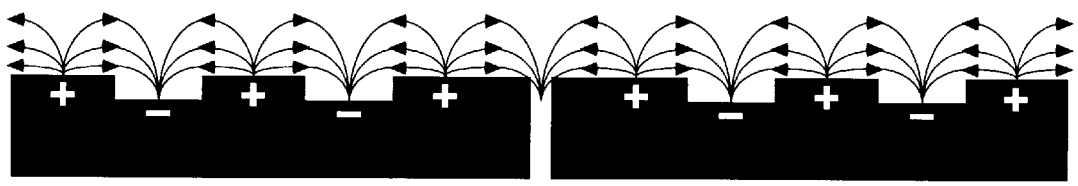
Figure 9C:
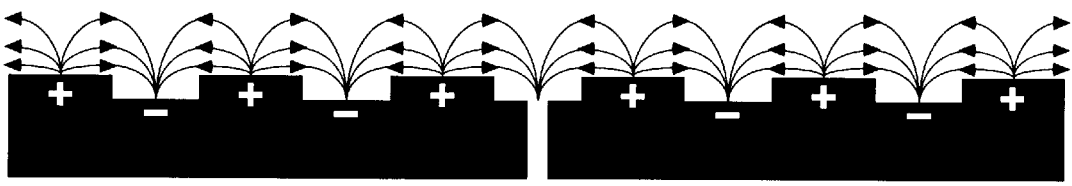

This is made graphically clear when the surface plasmon mode associated with the resonance at λ=800 nm is considered in real-space: it is a standing-wave of charge displacements at the metal film surface. FIG. 9A illustrates how, for this mode, the surface charge displacements occur between the ridges and the valleys of the surface topography. The thin lines with arrows indicate the resulting oscillating electric fields, which are strongly concentrated both at the centers of the ridges and the centers of the valleys, where the electric field is perpendicular to the metal film surface. When the aperture diameter is of order half the periodicity or more, the electric field enhancement at the entrance of the aperture is as large as that at the centers of the neighboring valleys. However, when $d_{A(exit)}$ is very small (FIGS. 6E, 9B), the strength of the electric field, which is parallel to the aperture wall, is reduced by the proximity of the metal, thus resulting in a reduced transmission enhancement. This can be overcome by matching the aperture geometry at its entrance to the geometry of the surface features (FIG. 9C) which does allow large electric fields to build up in a "hot spot" at the aperture entrance, which is now recessed by the surface feature depth; the latter is optimally in the range h=75–100 nm. This is accomplished in the structures with sinusoidal cross-sectional profiles (FIGS. 6B, 6D, 6F), of which the cross-sectional profile has the same salient features as that in FIG. 8C. In those structures, the thickness of the metal film at the aperture has been reduced from 400 nm to 300 nm. Although this may account for part of the difference between the $F_{SP}$ measured for structures with and without a depression at the position of the aperture, it is probably not enough to account for the entire and large difference.

Figure 9D:
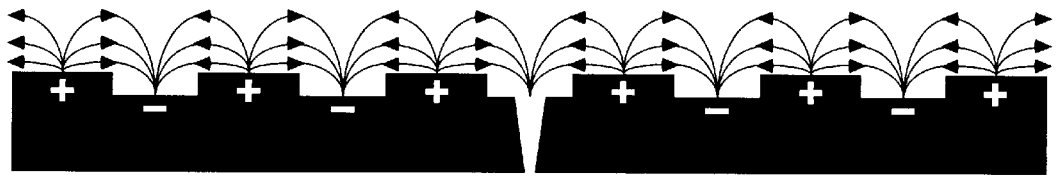

It will be noted that for the smallest aperture diameter, $d_{A(exit)}$=200 nm, $F_{SP}$ for the sinusoidal square-symmetry cross-section profile (open squares in FIG. 8) still lies significantly below the $F_{SP} \sim d_{A(exit)}^{-2}$ line, albeit not as far below as the case for the square wave cross-sectional profile with a straight cylindrical aperture (solid squares in FIG. 8). For the same reasons as those given above, this can be remedied by giving the aperture a conical cross-sectional profile with the larger diameter at the entrance allowing the high electric field buildup, and the small diameter at the exit determining the final resolution (FIG. 9D).

Figure 9E:
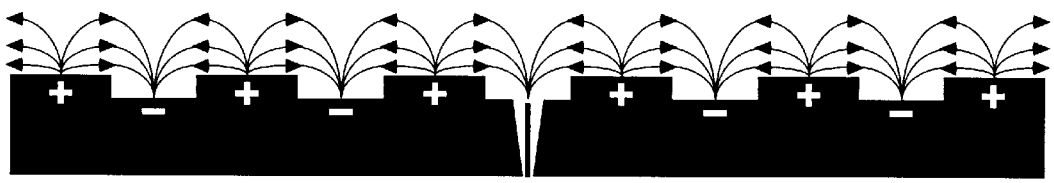

Alternatively, very high resolution may be obtained, without compromising the optical throughput, by giving the aperture a coaxial structure with a thin metallic wire at its axis (FIG. 9E). Such a geometry is expected to have very high throughputs even when the aperture diameter is very much smaller than the optical wavelength. See P. A. Wolff, "Coaxial NSOM," *NEC Research Institute, Inc. Technical Report*, no. 2000–025 (2000). The electric field distribution of a coaxial transmission line is very different from that of a cylindrical through aperture, so a coaxial aperture may require a different class of surface topography. Nevertheless, periodic arrays of coaxial apertures are reported to have peak transmissions significantly higher than comparable arrays of cylindrical apertures. See J. Raynolds et al., "Micron-scale Frequency Selective Surfaces for Thermo-Photovoltaic spectral control," *American Physical Society Meeting*, G10.004 (Mar. 13, 2001).

Figure 9F:
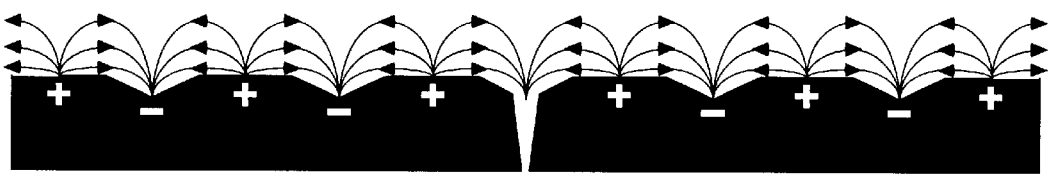

In the structures discussed above, the strategy for maximizing the optical throughput through the subwavelength aperture is to maximize the strength of the oscillating electric field at its entrance, by optimizing the aperture geometry. The surface topography can also contribute to an enhanced electric field at the aperture. FIG. 9F illustrates the case of grooves with triangular cross-sectional profile; for certain combinations for the depth and width of the triangular grooves the electromagnetic fields have a "hot spot" at the very bottom of the groove, where the curvature of the metal film surface is very large. See W.-C. Tan et al., "Flat surface-plasmon-polariton bands and resonant optical absorption on short-pitch metal gratings," *Physical Review B*, vol. 59, no. 19, pp. 12661–12666 (May 15, 1999). A similar hot spot will develop at the corresponding position at the aperture entrance.

It should be noted that the enhanced optical transmission apparatus of the present invention may also incorporate the features set forth in the Previous Patents so as to yield even further enhancements to the optical transmission provided by the apparatus.

In summary, the surface plasmon enhanced transmission of single apertures as a function of the aperture geometry has been studied. The transmission enhancement is largest when the shape of the aperture entrance matches that of the surrounding surface topography; in contrast, an aperture which is significantly dissimilar acts as a defect in the surface structure, leading to smaller transmission enhancements. This is especially important at the limit of very small aperture diameters relevant for NSOM and data storage applications.

Accordingly, the present invention provides enhanced light transmission apparatus which maximize the transmission enhancement through deeply subwavelength apertures by designing the geometry of both the aperture and the periodic surface topography to maximize the enhanced electromagnetic field at the aperture entrance. The aperture entrance within a few skin depths of the metal film surface preferably forms a continuous part of the surrounding surface topography, and that topography can be optimized to yield large electric fields at the centers of the valleys, such as for certain cases of a triangular cross-sectional profile. In addition, even for the smallest dadditional gains in the transmission enhancement can be obtained by filling the aperture with a dielectric material having an index of refraction greater than that of air. These strategies enable the design of structures which give the full potential transmission enhancement, even at very small aperture exit portion diameter ($d_{A(exit)} \ll P/2$), and enable fabrication of high-transmission devices in the $d_{A(exit)}=50$ nm range, resolutions appropriate both for high-resolution NSOM and for high-density optical data storage.

While there have been described and illustrated herein various enhanced optical transmission apparatus with improved aperture geometry, it will be apparent to those skilled in the art that further variations and modifications are possible without deviating from the broad teachings and spirit of the invention which shall be limited solely by the scope of the claims appended hereto.

What is claimed is:

1. An apparatus for enhanced light transmission comprising:
    a metal film having a first surface and a second surface;
    at least one aperture provided in the metal film and extending from the first surface to the second surface, the at least one aperture comprising an entrance portion disposed on the first surface of the metal film and an exit portion disposed in the second surface of the metal film, each portion having a cross-sectional area in the plane of the corresponding metal film surface, wherein the cross-sectional area of the entrance portion is not equal to the cross-sectional area of the exit portion; and
    a periodic surface topography provided on at least one of the first and second surfaces of the metal film, the periodic surface topography comprising a plurality of surface features, wherein the geometry of each aperture entrance portion substantially matches the geometry of the surface features.

2. The apparatus for enhanced light transmission of claim 1, wherein the cross-sectional area of the entrance portion is greater than the cross-sectional area of the exit portion.

3. The apparatus for enhanced light transmission of claim 1, wherein the cross-sectional area of the entrance portion is less than the cross-sectional area of the exit portion.

4. The apparatus for enhanced light transmission of claim 1, wherein the metal film is fixed to a substrate.

5. The apparatus for enhanced light transmission of claim 1, wherein the surface features comprise dimples.

6. The apparatus for enhanced light transmission of claim 1, wherein the surface features comprise semi-spherical protrusions.

7. The apparatus for enhanced light transmission of claim 1, wherein the surface features comprise grooves.

8. The apparatus for enhanced light transmission of claim 1, wherein the surface features comprise ribs.

9. The apparatus for enhanced light transmission of claim 1, wherein the surface features comprise concentric depressed rings.

10. The apparatus for enhanced light transmission of claim 1, wherein the surface features comprise concentric raised rings.

11. The apparatus for enhanced light transmission of claim 1, wherein the at least one aperture comprises a single aperture.

12. The apparatus for enhanced light transmission of claim 1, wherein the at least one aperture comprises a plurality of apertures.

13. The apparatus for enhanced light transmission of claim 12, wherein the plurality of apertures are periodically arranged, and wherein the periodic apertures and the periodic surface features are positionally commensurate and in phase.

14. The apparatus for enhanced light transmission of claim 1, wherein the exit portion of each aperture is provided with a cylindrical cross-sectional profile.

15. The apparatus for enhanced light transmission of claim 1, wherein the exit portion of each aperture is provided with a conical cross-sectional profile.

16. The apparatus for enhanced light transmission of claim 1, wherein the exit portion of each aperture is provided with a frustum-shaped cross-sectional profile.

17. The apparatus for enhanced light transmission of claim 1, wherein the exit portion of each aperture is coaxial.

18. The apparatus for enhanced light transmission of claim 1, wherein the light is incident on a surface of the metal film having the periodic surface topography provided thereon.

19. The apparatus for enhanced light transmission of claim 1, wherein the diameter of the entrance portion of the aperture is about one half of the periodicity of the surface features.

20. The apparatus for enhanced light transmission of claim 1, wherein each aperture is filled with a dielectric material having an index of refraction greater than that of air.

21. The apparatus for enhanced light transmission of claim 1, wherein each aperture is located within a valley of the periodic surface topography.

* * * * *